Figure 1:
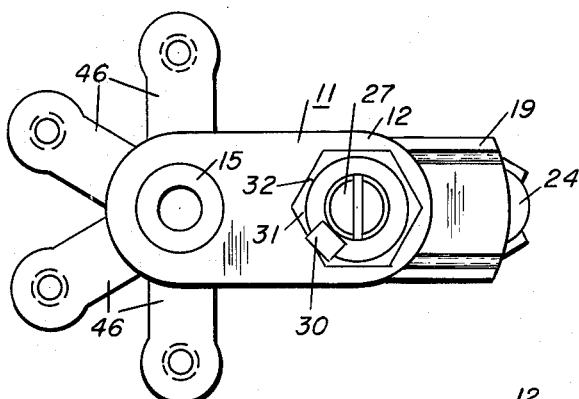

Sept. 21, 1965   C. S. MERTLER   3,207,876
DOUBLE BREAK CONTACT THERMOSTAT
Filed June 7, 1961   2 Sheets-Sheet 1

INVENTOR.
CHARLES S. MERTLER
BY Woodling, Krost,
Granger and Rust
attys

Sept. 21, 1965  C. S. MERTLER  3,207,876
DOUBLE BREAK CONTACT THERMOSTAT
Filed June 7, 1961  2 Sheets-Sheet 2

INVENTOR.
CHARLES S. MERTLER
BY Woodling, Krost,
Granger and Rust
attys.

United States Patent Office 3,207,876
Patented Sept. 21, 1965

3,207,876
DOUBLE BREAK CONTACT THERMOSTAT
Charles S. Mertler, Mansfield, Ohio, assignor to
Stevens Manufacturing Company, Inc.
Filed June 7, 1961, Ser. No. 115,471
8 Claims. (Cl. 200—138)

The invention relates in general to temperature responsive devices and, more particularly, to electrical thermostats arranged to open and close contacts wherein a double break is achieved to open both lines energizing a circuit.

The invention may be embodied in a thermostatic switch wherein first and second main contacts are carried relative to a base and first and second auxiliary contacts are also carried relative to the base. Adjusting means is provided for relative adjustment of the main contacts and temperature responsive means is carried on the base for relative positioning of the first and second main contacts. The adjusting means has an off condition region which provides the first and second main contacts out of engagement, and insulating means is moved with the adjusting means and acts to move the first and second auxiliary contacts out of engagement in the off condition region of the adjusting means. Accordingly, the main contacts may be used to control one side of the line and the auxiliary contacts may be used to control the other side of the line, and thus, whenever the adjusting means is in the off condition region, both sides of the line are opened to provide positive de-energization of the load circuit controlled by the thermostat.

Accordingly, one object of the invention is to provide a safety thermostat which will positively open both sides of the line to make certain that a load circuit is completely de-energized.

Another object of the invention is to provide a safety thermostat usable with a load energized from two conductors, either of which may be the grounded or groundable line and with the thermostat capable of opening both sides of the line to make certain that the line which is not grounded is open at the thermostat to render the load device safe.

Another object of the invention is to provide a double pole thermostat with a lost motion connection on one pole of the thermostat whereby another pole of the thermostat is adjustable for temperature adjustment conditions and said one pole is only operated through the lost motion connection near one rotational stop of the adjustment screw.

Another object of the invention is to provide a double pole thermostatic switch with a lost motion connection to one of the poles.

Another object of the invention is to provide a thermostatic switch for continuous operational adjustment of one pole of a double pole switch, including an off region in the continuous adjustment and a lost motion connection to the other pole of the switch to actuate that pole in the off region.

Figure 3:
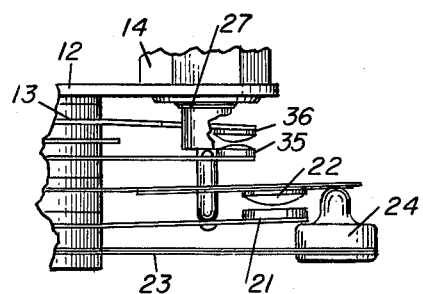
Figure 2:
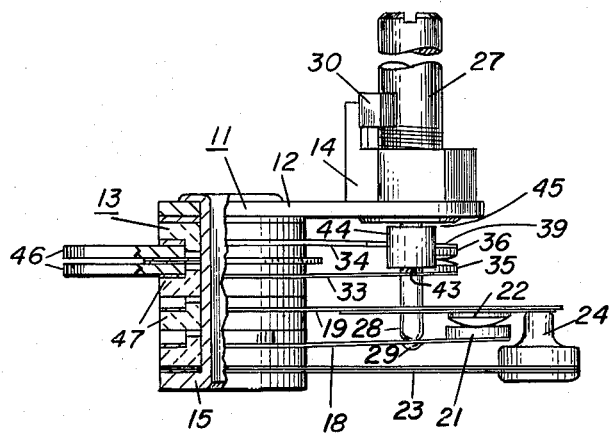
Figure 4:
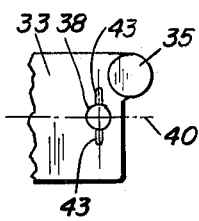
Figure 5:
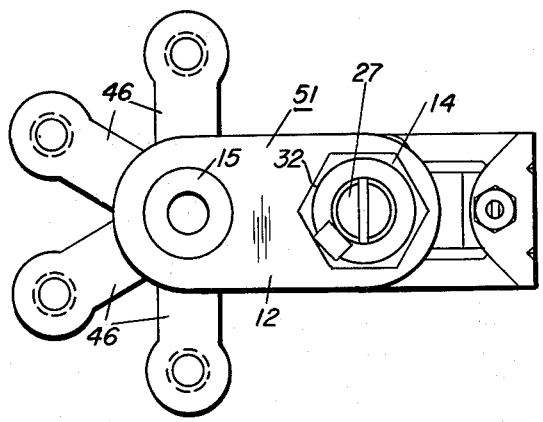
Figure 7:
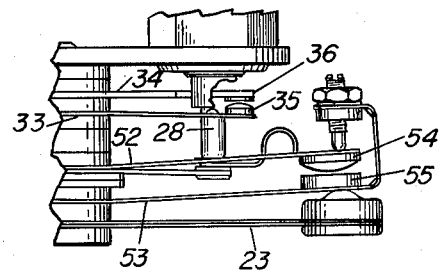
Figure 6:
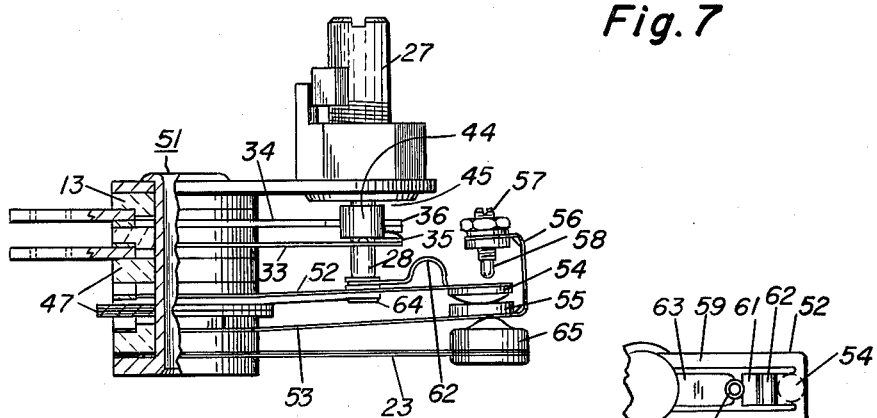
Figure 8:
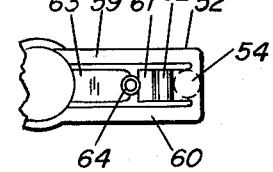

Other objects and a fuller understanding of this invention may be had by referring to the following description and claims, taken in conjunction with the accompanying drawings, in which:

FIGURE 1 is a plan view of a thermostat embodying the invention;
FIGURE 2 is a front elevational view partially in section;
FIGURE 3 is a partial elevational view of the thermostat adjusted to an off condition;
FIGURE 4 is a partial view of the auxiliary switch blade;
FIGURE 5 is a plan view of a modification;
FIGURE 6 is a front elevational view partially in section of the modification of FIGURE 5;
FIGURE 7 is a partial elevational view of the modification showing the off condition; and
FIGURE 8 is a partial view to a reduced scale of the snap acting strip.

The invention may take many forms and is shown in the FIGURES 1 to 4 as being embodied in a creep action thermostat 11 having a base 12 carrying a stack 13 and a threaded nut 14. The stack 13 mounts a plurality of blades, strips or leaf springs to the base 12 by means of a headed rivet 15. First and second main contact strips 18 and 19 are mounted in the stack 13 and carry first and second main contacts 21 and 22, respectively. The mounting of these contact strips in the stack 13 is such as to resiliently urge the contacts 21 and 22 into mutual engagement with the first contact 21 being urged upwardly and the second contact 22 being urged downwardly, as viewed in FIGURE 2. The contact strips 18 and 19 may be characterized as first and second control leaf spring and carrying first and second control contacts 21 and 22 respectively.

Temperature responsive means shown as a bimetallic blade or strip 23 is mounted in the bottom of the stack 13. An insulating stud 24 is carried on the outboard end of the bimetallic strip 23 to act on the second contact strip 19 for a creep action threof. A manual adjusting screw 27 is threadably received in the nut 14 and carries an insulating tip 28 bearing against a cup recess 29 in the first main contact strip 18. Thus, rotation of the screw 27 provides adjustment of the first main contact 21. This establishes the operating condition of the thermostat to adjust the temperature at which the contacts 21 and 22 open and close in the control function of the thermostat in controlling an electrical load. The adjusting screw 27 carries a lug 30 to engage opposite sides of a stop 31 on the nut 14. This provides rotational stops for the adjusting screw 27. When the lug 30 is at the opposite rotational stop from that shown in FIGURE 1, this is a first limit. This is the counter-clockwise rotational stop 32, as viewed in FIGURE 1, and is adjacent an off condition region of the adjusting screw 27. Rotation of the screw 27 toward this first limit separates the contacts 21 and 22 at room temperature by moving the first contact 21 downwardly in a first direction. Temperature changes in a first direction, for example increasing temperatures, will move the second contact strip 19 in a second direction, or upward direction, to separate the contacts 21 and 22.

The stack 13 also carries first and second auxiliary contact strips 33 and 34. First and second auxiliary contacts 35 and 36 are carried on the contact strips 33 and 34, respectively, for mutual cooperation. The first contact strip 33 is resilient and the mounting thereof in the stack 13 is such as to urge the contact 35 upwardly, as viewed in FIGURE 2, toward engagement with the second auxiliary contact 36. The second auxiliary contact strip 34 is bendable so that the second auxiliary contact 36 may be adjusted to remain in a relatively fixed position, but adjustable relative to the base 12. The first auxiliary contact strip 33 may be characterized as a first switch leaf spring which carries a first switch contact 35. The second auxiliary contact strip 34 may be characterized as a contact blade which carries a second switch contact 36.

The insulating tip 28 passes through an aperture 38 in the auxiliary contact strip 33 and also passes through an aperture in the second main contact strip 19 in order to bear against the first main contact strip 18. The second auxiliary contact strip 34 is L-shaped and has an outboard extension 39 which carries the second auxiliary contact 36 to one side of the longitudinal axis 40 of the first auxiliary contact strip 33.

Integral projections 43 are pressed or formed from the metal of the auxiliary contact strip 33 along a line perpendicular to the longitudinal axis 40 and along a diameter of the aperture 38. These projections extend slightly upwardly as viewed in FIGURE 2. An insulating sleeve 44 surrounds the insulating tip 28 and is acted on by the adjusting screw 27 and, in turn, acts on the projections 43. When the lug 30 is in the second rotational limit position shown in FIGURES 1 and 2, the first main contact 21 is in a position closest to base 12 and, therefore, a maximum temperature change from room temperature on the bimetallic blade 23 is required in order to open the contacts. When the adjusting screw 27 is rotated counter-clockwise, as viewed in FIGURE 1, to the first limit position 32, the screw 27 will be lowered to the position shown in FIGURE 3 and, accordingly, the main contact 21 is lowered to its maximum limit. In this position, as shown in FIGURE 3, the main contacts 21 and 22 are out of engagement at room temperature. Also, at this first rotational limit 32, the screw 27 has taken up a lost motion space 45 (see FIGURE 2) to engage the top of the insulating sleeve 44 and moved it downwardly sufficiently to move the first auxiliary contact 35 downwardly to open the auxiliary contacts 35 and 36. Thus, at the first rotational limit 32, both sets of contacts are open for a double break condition of the thermostat 11. The off condition region of the adjusting screw 27 may be a small arc, e.g. 30°, adjacent the first rotational limit 32, whereat the main and auxiliary contacts 35 and 36 are moved out of engagement. The insulating sleeve 44 is an insulator means moved in direct accordance with the screw 27 to open the auxiliary contacts 35 and 36 in the off condition region of the adjusting screw 27. FIGURE 2 shows a space 45 above the insulating sleeve 44 and this provides a lost motion connection between the adjusting screw 27 and the first auxiliary contact 35. The adjusting screw has an on condition region whereat the main contacts 21 and 22 are adjusted for the desired operating temperature of the thermostat. During assembly, the adjusting screw 27 may be moved to a position about 30° from the first rotational limit 32, and the second auxiliary contact strip bent to position the second auxiliary contact 36 just barely out of engagement with the first auxiliary contact 35. Then when the adjusting screw 27 is adjusted to the first rotational limit 32, the lost motion space 45 will be taken up as shown in FIGURE 3, and there will be a definite separation between the auxiliary contacts 35 and 36 just as there is a definite separation between the main contacts 21 and 22.

The four contact strips 18, 19, 33 and 34 may each have in engagement therewith, one of terminals 46 in the stack 13 and these various terminals and strips are mutually insulated from each other and from the rivet 15 by insulating washers 47.

The FIGURES 5, 6 and 7 show a modification of the invention with many parts similar to the embodiment of FIGURES 1 to 4. The parts that are the same are designated by the same reference numerals and, accordingly, a detailed description of such common parts will not be made. The FIGURES 5, 6 and 7 show a snap acting thermostat 51 carrying first and second main contact strips 52 and 53 in the stack 13. These contact strips carry the first and second main contacts 54 and 55, respectively. The first main contact strip 52 has a U-shaped extension 56 on the outboard end thereof carrying and adjusting screw 57 with an insulating tip 58. This insulating tip 58 is closely spaced to the rear face of the first main contact strip 52 in the normal or operating position of the thermostat as shown in FIGURE 6 and limits the position of this main contact strip 52 in the open circuit condition as shown in FIGURE 7. The main contact strip 52 is better shown to reduced scale in FIGURE 8 and includes first and second outer legs 59 and 60 and a central tongue 61 which is integral with the contact strip 52 at the outboard end. This central tongue 61 has a spring loop 62 for longitudinal resiliency. A central strip 63 extends outwardly from the stack 13 and carries a socket 64. This socket receives the end of the insulator tip 28. The bimetallic blade 23 carries an insulating stud 65 to bear against the underside of the second main contact strip 53.

The adjusting screw 27 may be rotated counter-clockwise to the first rotational limit 32 and when rotated clockwise, as viewed in FIGURE 5, this moves the first main contact strip 52 in a first direction. The central tongue 61 and central strip 63 form a type of toggle or over-center snap action mechanism, and when the socket 64 is moved down below the longitudinal axis of the main contact strip 52, this contact strip snaps over the center and the first main contact 54 snaps upwardly as viewed in FIGURES 6 and 7 to the position shown in FIGURE 7. The resilient mounting of the second main contact strip 53 tends to urge the second main contact 55 downwardly toward engagement with the insulating stud 65, however, the operating condition position of the first main contact strip 52 is such as to urge the first main contact 54 downwardly toward engagement with the second main contact 55. Thus, the total effective resilient biasing of the contact strips 52 and 53 is such as to urge the main contacts 54 and 55 into engagement when these contacts are touching. However, when the first main contact strip 52 is snapped over center and the contacts 54 and 55 are separated, as shown in FIGURE 7, then the resilient mounting afforded by the main contact strips 52 and 53 is such as to tend to separate the main contacts 54 and 55.

FIGURE 6 shows the thermostat 51 in the operating or on condition region, wherein temperature changes in a first direction move the bimetallic blade 23 upwardly. This moves both contacts 54 and 55 upwardly until a point is reached whereat the main contact strip 52 snaps over center. This then establishes the open circuit position as shown in FIGURE 7.

The insulating sleeve 44 is again provided, again with a lost motion connection as shown in FIGURE 6 by the space 45. This space is present during the operating condition region as shown in FIGURES 5 and 6. When the adjusting screw 27 is moved to the first rotational limit 32, this moves the insulating tip 28 downwardly and takes up the lost motion connection to move the insulating sleeve 44 downwardly, in turn moving the first auxiliary contact 35 downwardly to break contact with the second auxiliary contact 36. This open circuit arrangement is at the off condition region and, thus, both sets of contacts are out of engagement. When an electrical load is connected for energization through the thermostats 11 or 51, one side of the line may be connected through the main contacts 21 and 22 or 54 and 55 and the other side of the line may be connected through the auxiliary contacts 35 and 36. Especially with portable devices having a cord and plug for use at a convenience outlet, it is always possible that the grounded or groundable line may be the one in which the thermostat main control contacts 21 and 22 were inserted. If the auxiliary control contacts 35 and 36 were not provided, then this would mean that the hot side of the line was connected directly to the electrical load, even though the main control contacts were adjusted to an off condition. Thus, the thermostats of the present invention provide auxiliary control contacts to make certain that both sides of the line are interrupted in the off condition to thus completely disconnect both sides of the electrical load from the line and, thus, establish a positively safe load condition.

The lost motion connection between the screw 27 and the insulating sleeve 44 assures that the screw 27 may perform a dual function. A first function is to adjust the relative position of the main contacts 21 and 22 or 54 and 55 to adjust the operating condition for temperature of operation of the thermostat. The second function is to actuate the auxiliary contacts 35 and 36 only at the off condition region. This may then be used to break the second conductor to the electrical load and during the operating region, this lost motion connection assures that the second line to the load will be closed.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A thermostatic switch, comprising in combination, a base, first and second main contacts, means carrying said contacts relative to said base and relatively movable for mutual cooperation, first and second auxiliary contacts carried relative to said base for mutual cooperation, temperature responsive means carried on said base for relative positioning of said first and second main contacts, adjusting means carried relative to said base for relative adjustment of said main contacts to adjust the operating condition thereof, said adjusting means having an off condition region providing said first and second main contacts out of engagement, and a lost motion insulating sleeve surrounding said adjusting means and moved in accordance with said adjusting means in said off condition region to relatively move said first and second auxiliary contacts out of engagement.

2. A thermostatic switch, comprising in combination, a base, first and second main contacts, means carrying said contacts relative to said base and relatively movable for mutual cooperation, first and second auxiliary contacts mounted on said base for mutual cooperation, an adjusting screw threadably received relative to said base, insulating means acting between said adjusting screw and one of said main contacts for relative adjustment of said main contacts, temperature responsive means carried on said base for temperature responsive relative positioning of said first and second main contacts, a rotational stop acting between said adjusting screw and said base, said adjusting screw having an operating region and having an off condition region adjacent said rotational stop, said off condition region providing said first and second main contacts out of engagement, and lost-motion insulating means moved in direct accordance with said screw and having a portion acting to move said first auxiliary contact out of engagement with said second auxiliary contact when said adjusting screw is in said off condition region.

3. A thermostat comprising, in combination, a base, first and second control contacts, resilient means mounting said control contacts relative to said base and mounting said contacts for relative movement and urging said contacts toward mutual engagement, an adjusting screw threadably carried on said base to relatively separate said contacts upon rotation of said screw in a first rotational direction toward a first limit, bimetallic means mounted on said base and arranged to relatively separate said contacts upon temperature changes in a first direction, a switch leaf spring carried on said base, a first switch contact carried on said switch leaf spring, a second switch contact carried relative to said base for cooperation with said first switch contact, the mounting of said switch leaf spring on said base urging said first and second switch contacts toward mutual engagement, first and second integral projections extending from the side of said first switch leaf spring carrying said first switch contact, said projections lying on a line substantially perpendicular to the lengthwise axis of said first switch leaf spring, insulating means moved by said screw and acting on said projections, and the length of said insulating means being such that a room temperature with said screw rotated to said first limit said screw relatively moves said first and second control contacts out of engagement and said insulating means moves said first switch contact out of engagement with said second switch contact.

4. A double contact thermostatic switch, comprising in combination, a base, first and second resilient main contact strips carried on said base, first and second auxiliary contact strips carried on said base, first and second main contacts carried on said first and second main contact strips, respectively, for mutual cooperation, first and second auxiliary contacts carried on said first and second auxiliary contact strips, respectively, for mutual cooperation, said first auxiliary contact strip being resilient and said second auxiliary contact strip being bendable, a manual adjusting screw threadably received relative to said base, an insulating tip carried on said adjusting screw and abutting said first main contact strip for adjustment of same for relative adjustment of said main contacts, a bimetallic strip carried on said base and having an insulating stud adapted for engagement with said second main contact strip to move same for temperature responsive relative positioning of said first and second main contacts, a rotational stop acting between said adjusting screw and said base, said adjusting screw having an operating region and having an off condition region adjacent said rotational stop, said off condition region providing adjustment of said insulating tip to position said first and second main contacts out of engagement, and an insulating sleeve surrounding said insulating tip and moved in direct accordance therewith and having an end in engagement with said first auxiliary contact strip to move said first auxiliary contact out of engagement with said second auxiliary contact when said adjusting screw is in said off condition region.

5. A thermostat comprising, in combination, a base, first and second control contacts, resilient means carried on said base and carrying said control contacts for mutual cooperation, the mounting of said resilient means on said base urging said contacts toward mutual engagement, an adjusting screw threadably carried on said base, an insulator tip carried by said screw to relatively separate said contacts upon rotation of said screw in a first rotational direction toward a first limit, bimetallic means mounted on said base and arranged to relatively separate said contacts upon temperature changes in a first direction, a switch leaf spring fixedly carried on said base, a first switch contact carried on said switch leaf spring, a second switch contact carried on said base for cooperation with said first switch contact, the mounting of said switch leaf spring on said base urging said first and second switch contacts toward mutual engagement, first and second integral projections extending from the side of said first switch leaf spring carrying said first switch contact, said projections lying on a line substantially perpendicular to the lengthwise axis of said first switch leaf spring, an insulating sleeve carried by said screw and surrounding said insulator tip and acting on said projections, and the length of said insulating sleeve being so related to the length of said insulator tip that at room temperature with said screw rotated to said first limit said insulator tip relatively moves said first and second control contacts out of engagement and said insulating sleeve moves said first switch contact out of engagement with said second switch contact.

6. A double contact creep action thermostatic switch, comprising in combination, a base, first and second resilient creep action main contact strips carried on said base, first and second auxiliary contact strips carried on said base, first and second main contacts carried on said first and second main contact strips, respectively, for mutual cooperation, first and second auxiliary contacts carried on said first and second auxiliary contact strips, respectively, for mutual cooperation, said first auxiliary contact strip being resilient and said second auxiliary contact strip being bendable, a manual adjusting screw threadably received relative to said base, an insulating tip carried on said adjusting screw and abutting said first main contact strip for adjustment of same for relative adjustment of said main contacts, a bimetallic strip carried on said base and having an insulating stud adapted for engagement with said second main contact strip to move same for temperature responsive relative positioning of said first and second main contacts, a rotational stop acting between said adjusting screw and said base, said adjusting screw having an operating region and having an off condition region adjacent said rotational stop, said off condition region providing adjustment of said insulating tip to position said first and second man contacts out of engagement, and an insulating sleeve surrounding said insulating tip and moved in direct accordance therewith and having an end in engagement with said first auxiliary contact strip to move said first auxiliary contact out of engagement with said second auxiliary contact when said adjusting screw is in said off condition region.

7. A thermostat comprising, in combination, a base, a stack fixed on said base, first and second control contacts, resilient means fixedly carried in said stack and including a control leaf spring and carrying said first and second control contacts for mutual cooperation, the mounting of said resilient means in said stack urging said contacts toward mutual engagement, an adjusting screw threadably carried on said base, an insulator tip carried by said screw to move said control leaf spring to relatively separate said contacts upon rotation of said screw in a first rotational direction toward a first limit, a bimetallic blade mounted in said stack and arranged to relatively separate said contacts upon temperature changes in a first direction, a switch leaf spring fixedly carried in said stack, a first switch contact carried on said switch leaf spring, a contact blade carried in said stack, a second switch contact carried on said contact blade for cooperation with said first switch contact, the mounting of said switch leaf spring in said stack urging said first and second switch contacts toward mutual engagement, first and second integral projections extending from the side of said first switch leaf spring carrying said first switch contact, said projections lying on a line substantially perpendicular to the lengthwise axis of said first switch leaf spring, an insulating sleeve carried by said screw and surrounding said insulator tip and acting on said projections, and the length of said insulating sleeve being so related to the length of said insulator tip that at room temperature with said screw rotated to said first limit said insulator tip moves said first control contact out of engagement with said second control contact and said insulating sleeve moves said first switch contact out of engagement with said second switch contact.

8. A creep action thermostat comprising, in combination, a base, a stack fixed on said base, first and second control leaf springs fixedly carried in said stack, first and second control contacts mounted on said first and second control leaf springs, respectively, for mutual cooperation, the mounting of said control leaf springs in said stack urging said contacts toward mutual engagement, an adjusting screw threadably carried on said base, an insulator tip carried by said screw to move said first control leaf spring in a first direction to separate said contacts upon rotation of said screw in a first rotational direction toward a first limit, a bimetallic blade mounted in said stack and arranged to move said second control leaf spring in a second direction to separate said contacts upon temperature changes in a first direction, a switch leaf spring fixedly carried in said stack, a first switch contact carried on said switch leaf spring, a contact blade carried in said stack, a second switch contact carried on said contact blade for cooperation with said first switch contact, the mounting of said switch leaf spring in said stack urging said first and second switch contacts toward mutual engagement, surfaces defining holes in said second control and first switch leaf springs through which said insulator tip passes to engage said first control leaf spring, first and second integral projections on said first switch leaf spring diametrically opposed relative to said hole therein, said projections extending from the side of said first switch leaf spring carrying said first switch contact and lying on a line substantially perpendicular to the lengthwise axis of said first switch leaf spring, an insulating sleeve carried by said screw and surrounding said insulator tip and acting on said projections, and the length of said insulating sleeve being so related to the length of said insulator tip that at room temperature with said screw rotated to said first limit said insulator tip moves said first control contact out of engagement with said second control contact and said insulating sleeve moves said first switch contact out of engagement with said second switch contact.

References Cited by the Examiner
UNITED STATES PATENTS

| | | | |
|---|---|---|---|
| 2,527,767 | 10/50 | Schmidt | 200—138 |
| 2,527,775 | 10/50 | Sutton | 200—138 |
| 2,720,568 | 10/55 | Bletz | 200—138 |
| 2,791,662 | 5/57 | Mertler | 200—138 |
| 2,814,686 | 11/57 | Wilder | 200—67 |
| 2,847,553 | 8/58 | Smith | 200—138 |
| 2,924,700 | 2/60 | Huffman | 200—136 |

BERNARD A. GILHEANY, *Primary Examiner.*

MAX L. LEVY, *Examiner.*